United States Patent Office 2,890,209
Patented June 9, 1959

2,890,209

POLYMERS OF 3,4-EPOXYCYCLOHEXYLMETHYL 3,4-EPOXYCYCLOHEXANECARBOXYLATES

Benjamin Phillips, Charleston, Frederick C. Frostick, Jr., South Charleston, Charles W. McGary, Jr., Charleston, and Charles T. Patrick, Jr., St. Albans, W. Va., assignors to Union Carbide Corporation, a corporation of New York No Drawing. Application May 24, 1956
Serial No. 586,933

8 Claims. (Cl. 260—78.3)

This invention relates to novel polymers. More particularly this invention is directed to novel polymer compositions prepared by the catalytic etherification of 3,4-epoxycyclohexylmethyl 3,4-epoxycyclohexanecarboxylates.

The novel polymers of this invention are polymers of compounds represented by the general formula:

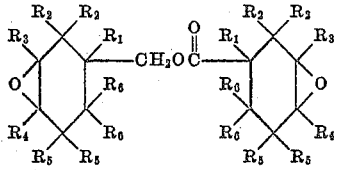

wherein $R_1$, $R_2$, $R_3$, $R_4$, $R_5$ and $R_6$ represent members selected from the group consisting of hydrogen and alkyl groups. More particularly $R_1$ thorough $R_6$ represent members selected from the group consisting of hydrogen and lower alkyl groups containing from one through four carbon atoms. When any of $R_1$ through $R_6$ represent alkyl groups and particularly lower alkyl groups, a preferred class of diepoxides are those wherein the total number of carbon atoms contained in said alkyl groups does not exceed twelve. A particularly preferred class of compounds represented by the general formula above are those wherein $R_1$ through $R_6$ represent members selected from the group consisting of hydrogen and methyl groups. Polymers and particularly the homopolymers made from diepoxide monomers and mixtures thereof having not more than 3 alkyl substituents per carbocyclic ring are preferred.

The diepoxides represented by the general formula above can be conveniently prepared by reacting a selected 3-cyclohexenylmethyl 3-cyclohexenecarboxylate with peracetic acid. The 3-cyclohexenylmethyl 3-cyclohexenecarboxylates, in turn, are readily prepared by reacting a selected 3-cyclohexenecarboxaldehyde in the presence of an aluminum alkoxide catalyst dissolved in an inert solvent, such as benzene, at a temperature in the range of 0° C. to 110° C.

Typical 3-cyclohexenecarboxaldehydes which can be employed to produce the 3-cyclohexenylmethyl 3-cyclohexenecarboxylate, employed as starting material to produce the diepoxides include:

3 - cyclohexenecarboxaldehyde; 2,4 - dimethyl-3-cyclohexenecarboxaldehyde; 3,4 - dimethyl-3-cyclohexenecarboxaldehyde; 3 or 4-methyl-3-cyclohexenecarboxaldehyde; 2 - methyl-3-cyclohexenecarboxaldehyde; 2,2,5,5-tetramethyl-3-cyclohexenecarboxaldehyde; 2,2-dimethyl-5 - methyl-3-cyclohexenecarboxaldehyde; 2,2-dimethyl-4-methyl-3-cyclohexenecarboxaldehyde; 3 or 4-methyl-6,6-dimethyl-3-cyclohexenecarboxaldehyde; 3 or 4-methyl-6-methyl-3-cyclohexenecarboxaldehyde; 3 or 4-methyl-6-ethyl-3-cyclohexenecarboxaldehyde; 1 methyl-3- or 4-methyl - 6 - ethyl-3-cyclohexenecarboxaldehyde; 2,2,6-trimethyl - 3-cyclohexenecarboxaldehyde; 2,4,6-trimethyl-3-cyclohexenecarboxaldehyde; 2,5,6-trimethyl-3-cyclohexenecarboxaldehyde; 2,2,4-trimethyl-3-cyclohexenecarboxaldehyde; 2,2,5-trimethyl-3-cyclohexenecarboxaldehyde; 3 or 4,6,6-trimethyl-3-cyclohexenecarboxaldehyde; 2,2,5,5,6-pentamethyl-3-cyclohexenecarboxaldehyde; 2,2,5,6(or 1) - tetramethyl-3-cyclohexene-1 (or 6)-carboxaldehyde; 2,2,4,6 (or 1)-tetramethyl-3-cyclohexene-1 (or 6)-carboxaldehyde.

The 3-cyclohexenylmethyl 3-cyclohexenecarboxylate, thus produced can then be reacted with peracetic acid to produce the diepoxide monomers which are employed in the process of this invention to produce the novel polymer compositions of this invention.

As hereinbefore referred to, the process of this invention comprises reacting, in the presence of a catalyst, a 3,4-epoxycyclohexylmethyl 3,4-epoxycyclohexanecarboxylate at a temperature in the range of from 25° to about 200° C.

The catalysts which have been found to be particularly useful in preparing the novel compositions of this invention are the acid catalysts and particularly the acid catalysts of the Lewis acid type. Typical Lewis acid type catalysts include boron trifluoride, stannic chloride, zinc chloride, aluminum chloride, ferric chloride and the like. Complexes of the various Lewis acids, such as the etherates, and aminates of boron trifluoride are also effective. Other acid catalysts which can be employed include sulfuric acid, phosphoric acid, perchloric acid, polyphosphoric acid and the various sulfonic acids such as toluene sulfonic acid.

The amount of catalyst employed is not narrowly critical and can be employed in an amount in the range of from 0.005 percent to 10.0 percent depending on the catalyst used and the temperature of polymerization. The catalyst is added to the diepoxide monomer at a low temperature preferably in the range of from 0° C. to 25° C. to form a homogenous mass.

After the reaction mixture has been formed the mixture is heated to a temperature in the range of from 50° C. to 160° C. to effect a gel. After gelation a post cure is generally carried out at temperatures in the range of from 100° C. to 250° C. for a period of time ranging from thirty minutes to ten hours depending on the temperature, catalyst and amount of catalyst.

The resin products produced are hard, tough, transparent, substantially colorless products suitable for use in castings which can be machined to make a variety of useful products such as buttons, handles for tools and the like. The compositions are also useful as adhesives, coatings, molding compositions and the like.

The following examples will serve to illustrate the practice of the invention:

EXAMPLE I

*Preparation of 3-cyclohexenylmethyl 3-cyclohexenecarboxylate*

Aluminum isopropoxide (102 grams, 0.5 mol) was dissolved in 900 grams of dry benzene in a 5-liter glass flask fitted with a stirrer and dropping funnel. The stirred contents of the flask were maintained at 20° C.–25° C. by immersing the flask in a water bath, and 2,200 grams (20 mols) of 3-cyclohexenecarboxaldehyde were added dropwise over a period of 5 hours. After all the aldehyde was added, the reaction solution was left standing at the same temperature for 16 hours, and then mixed with 83 ml. of concentrated hydrochloric acid. The aqueous layer was separated off, and the organic layer was then fractionally distilled. There was obtained 1932 grams (88 percent yield) of 3-cyclohexenylmethyl 3-cyclohexenecarboxylate, having a boiling point of 129° C.–130° C. at 3 mm. Hg absolute and a refractive index, $n_D^{30}$ of 1.4940.

EXAMPLE II

*Preparation of 1-methyl-3-cyclohexenylmethyl 1-methyl-3-cyclohexenecarboxylate*

Aluminum isopropoxide (7.7 grams, 0.0375 mol) was dissolved in 150 grams of dry benzene in a one-liter flask fitted with a stirrer and dropping funnel. The stirred contents of the flask were maintained at 20° C.–25° C. by immersing the flask in a water bath, and 192 grams (1.55 mols) of 1-methyl-3-cyclohexenecarboxaldehyde were added dropwise over 40 minutes. The reaction was allowed to proceed for a period of 18.5 hours, and then 7 grams (0.118 mol) of the acetic acid was added to neutralize the catalyst. The reaction solution was distilled and there was obtained 88 grams (45 percent yield) of 1-methyl-3-cyclohexenylmethyl 1-methyl-3-cyclohexenecarboxylate having a boiling point of 136° C.–140° C. at 3 mm. Hg absolute and a refractive index, $n_D^{30}$ of 1.4860.

EXAMPLE III

*Preparation of 6-methyl-3-cyclohexenylmethyl 6-methyl-3-cyclohexenecarboxylate*

Aluminum isopropoxide (102 grams, 0.5 mol) was dissolved in 800 grams dry benzene in a 5-liter glass flask fitted with a stirrer and dropping funnel. The contents of the flask were stirred and kept at 20° C.–25° C. by immersing the flask in a water bath, and 2480 grams (20 mols) of 6-methyl-3-cyclohexenecarboxaldehyde were added through the dropping funnel over a period of four hours. After addition of the aldehyde, the reaction solution was allowed to stand at the same temperature for 16 hours and then 152 grams of acetic acid was added to neutralize the aluminum isopropylate. After thorough mixing, the reaction solution was fractionally distilled, and there was obtained 1938 grams of 6-methyl-3-cyclohexenylmethyl 6-methyl-3-cyclohexenecarboxylate, having a boiling point of 133° C. at 3 mm. Hg absolute and a refractive index, $n_D^{30}$ of 1.4870. The yield was 78.3 percent of theory.

EXAMPLE IV

*Preparation of 3,4-epoxycyclohexylmethyl 3,4-epoxycyclohexanecarboxylate*

To 144 grams (0.655 mol) of 3-cyclohexenylmethyl 3-cyclohexenecarboxylate in a 1-liter flask was added dropwise over a period of two and one-fourth hours 488 grams of a 25.5 percent solution of peracetic acid in acetone (124 grams, 1.64 mols, of peracetic acid). The stirred reaction solution was maintained at 20° C.–25° C. by immersing the reaction in a cold water bath. After the addition was complete the reaction flask was immersed in a cold bath (−11° C.) and allowed to stand for 16 hours. The contents of the flask were then added dropwise to a still kettle containing ethyl benzene refluxing under reduced pressure at 40° C.–45° C. kettle temperature. During the addition, there was distilled off at the head a mixture of acetone, acetic acid, peracetic acid and ethyl benzene. After addition was complete, the remaining low-boiling materials were distilled off, and there was obtained 164 grams of residue product analyzing 86 percent purity as 3,4-epoxycyclohexylmethyl 3,4-epoxycyclohexanecarboxylate by determination of epoxide groups, 10.7 percent unreacted 3-cyclohexenylmethyl 3-cyclohexenecarboxylate by determination of double bonds, and 0.2 percent acidic impurities calculated as acetic acid. The yield of diepoxide was 85.5 percent.

EXAMPLE V

*Preparation of 3,4-epoxy-1-methylcyclohexylmethyl 3,4-epoxy-1-methylcyclohexanecarboxylate*

To 84 grams (0.338 mol) of 1-methyl-3-cyclohexenylmethyl 1-methyl-3-cyclohexenecarboxylate in a one-liter flask was added dropwise over a period of one and one-half hours 308 grams of a 25 percent solution of peracetic acid in acetone (77 grams, 1.01 mols, of peracetic acid). The stirred reaction solution was maintained at 35° C.–40° C. by immersing the reaction flask in a water bath. After the addition was complete, the reaction solution was stirred at 35° C.–40° C. for 1½ hours and then stored at −11° C. for 16 hours. Analysis at this time indicated 89.6 percent of the theoretical amount of peracetic acid had reacted. The reaction solution was heated to 40° C. and stirred for another two hours at which time analysis for peracetic acid showed 94.5 percent had reacted. The solution was added dropwise to a still kettle containing 4400 grams of ethylbenzene refluxing under reduced pressure at 40° C.–45° C. kettle temperature. During the addition, there was distilled off at the head a mixture of acetone, acetic acid, peracetic and ethylbenzene. After addition was complete, the remaining low-boiling materials were distilled off, and there was obtained 97 grams of residue product analyzing 82 percent 3,4-epoxy-1-methylcyclohexylmethyl 3,4-epoxy-1-methylcyclohexanecarboxylate by determination of epoxide groups, 1.6 percent unreacted 1-methyl-3-cyclohexenylmethyl 1-methyl-3-cyclohexenecarboxylate by determination of double bonds, and 0.2 percent acidic impurities calculated as acetic acid. The yield of diepoxide was 84 percent.

The residue product (75 grams) was distilled without fractionation to yield 67 grams of colorless liquid, having a boiling point of 180° C.–195° C. at 3 mm. Hg absolute and a refractive index, $n_D^{30}$ of 1.4855, which analyzed 83.5 percent 3,4-epoxy-1-methylcyclohexylmethyl 3,4-epoxy-1-methylcyclohexanecarboxylate by analysis for epoxide groups and 1.95 percent 1-methyl-3-cyclohexenylmethyl 1-methyl-3-cyclohexenecarboxylate by analysis for double bonds.

EXAMPLE VI

*Preparaiton of 6-methyl-3,4-epoxycyclohexylmethyl 6-methyl-3,4-epoxycyclohexanecarboxylate*

To 620 grams (2.5 mols) of 6-methyl-3-cyclohexenylmethyl 6-methyl-3-cyclohexenecarboxylate in a 5-liter flask was added dropwise over a period of six and one-half hours 2690 grams of a 21.6 percent solution of peracetic acid in acetone (570 grams, 7.5 mols, of peracetic acid). The contents of the flask were stirred and maintained at 40° C. during the addition by immersing the reaction flask in a water bath. After addition was complete, the reaction conditions were maintained for an additional one-half hour and then the reaction flask was immersed in a cold bath at −11° C. for 16 hours. Analysis at the end of this period indicated 98.7 percent of the theoretical amount of peracetic acid was used up. The reaction solution was then heated to 42° C. and maintained at that temperature for an additional one and one-half hours, and then analysis indicated 100 percent of the theoretical amount of peracetic acid had been consumed.

The reaction solution was then added dropwise to a still kettle containing 1400 grams of ethyl benzene refluxing at 25 mm. pressure. Acetone, peracetic acid, acetic acid and ethyl benzene were distilled off at the head during the addition, and after addition was complete all low-boiling material was stripped off up to a kettle temperature of 60° C. at 1 mm. There was obtained 736 grams of residue product which analyzed 85.4 percent purity as 6-methyl-3,4-epoxycyclohexylmethyl 6-methyl-3,4-epoxycyclohexanecarboxylate by determination of epoxide groups, 3.1 percent as unreacted 6-methyl-3-cyclohexenemethyl 6-methyl-3-cyclohexenecarboxylate by determination of double bonds, and 0.3 percent acidity as acetic acid. The yield corresponded to 89.8 percent of theory.

By distilling a sample of the crude diepoxide under reduced pressure there was obtained a purified product. It was a colorless, sweet-smelling liquid having the following properties: boiling point 335° C. at 760 mm. Hg absolute; 185° C.–186° C. at 3 mm. Hg absolute and a refractive index, $n_D^{30}$ of 1.4880.

EXAMPLE VII

*Preparation of 3,4-epoxy-(3- and/or 4)-methylcyclohexylmethyl 3,4-epoxy-(3 and/or 4)-methylcyclohexanecarboxylate*

The Diels-Alder adduct of isoprene and acrolein was subjected to a Tischenko condensation as described in Example I. Upon distillation under reduced pressure there was obtained in good yield (3 and/or 4)-methyl-3-cyclohexenylmethyl (3 and/or 4)-methyl-3-cyclohexenecarboxylate, a colorless liquid boiling at 160° C.–164° C. at 3 mm. pressure. To 0.371 mol of this mixture of isomeric esters was added a 25 percent peracetic acid (1.11 mols) solution in acetone over a period of 1.33 hours at 40° C. After an additional 2-hour reaction period the reaction mixture was added to 500 cc. of ethylbenzene (to facilitate removal of the acetic acid) and distilled. The product was a mixture of isomers boiling at 187° C.–195° C. at 3 mm. Hg absolute and having a refractive index range of 1.4822–1.4830 ($n_D^{30}$). The purity, as determined by an anlysis for epoxide groups by the pyridine hydrochloride method, was 95 percent calculated as 3,4-epoxy-(3 and/or 4)-methylcyclohexylmethyl 3,4-epoxy-(3 and/or 4)-methylcyclohexanecarboxylate.

EXAMPLE VIII

*Preparation of 3,4-epoxy (2 and/or 5)-methylcyclohexylmethyl 3,4-epoxy (2 and/or 5)-methylcyclohexanecarboxylate*

The Diels-Alder adduct of piperylene and acrolein was subjected to a Tischenko condensation as described in Example I. Upon distillation under reduced pressure there was obtained in good yield (2 and/or 5)-methyl-3-cyclohexenylmethyl (2 and/or 5)-methyl-3-cyclohexenecarboxylate, a colorless liquid boiling at 145° C.–147° C. at 3.0 mm. and having a refractive index of 1.4906 ($n_D^{30}$). To 0.387 mol of this ester was added over a period of 1.67 hours a 25 percent solution of peracetic acid (1.16 mols) in acetone at 40° C. After an additional 2 hours' reaction period the reaction mixture was added to 500 cc. of ethylbenzene (to facilitate the removal of acetic acid) and the volatile components were removed to a kettle temperature of 70° C. at 3 mm. pressure. The residue product (108 grams) analysed 90 percent of the corresponding diepoxide. The residue product was fractionated on a short column and gave a 79 percent yield of 3,4-epoxy (2 and/or 5)-methyl-cyclohexylmethyl 3,4-epoxy (2 and/or 5)- methylcyclohexanecarboxylate, a colorless liquid having a boiling point of 183° C.–185° C. at 2 mm. and a refractive index of 1.4927 ($n_D^{30}$). The purity was 99.5 percent as determined by a pyridine hydrochloride analysis for epoxide.

EXAMPLE IX

*The homopolymer of 3,4-epoxy-6-methylcyclohexylmethyl 3,4-epoxy-6-methylcyclohexanecarboxylate*

3,4 - epoxy - 6 - methylcyclohexylmethyl 3,4-epoxy-6-methyl-cyclohexanecarboxylate (1.4 grams) and four drops (about 0.006 gram of stannic chloride per drop) of a 10 percent solution of stannic chloride in ethyl acetate were mixed at room temperature and then placed in an oven at a temperature of 110° C. A gel time of five minutes was observed and upon further curing for 20 hours at a temperature of 110° C. there was obtained a colorless, transparent resin which had a Barcol hardness of 37.

EXAMPLE X

*The homopolymer of 3,4-epoxy-6-methylcyclohexylmethyl 3,4-epoxy-6-methylcyclohexanecarboxylate*

3,4-epoxy-6-methylcyclohexylmethyl 3,4-epoxy-6-methyl-cyclohexanecarboxylate (9 grams) was mixed with eight drops (about 0.0002 gram of sulfuric acid per drop) of a 1 percent sulfuric acid solution in water. The resulting solution gelled in ten minutes at a temperature of 160° C. and upon further curing for an additional hour, there was obtained a hard, brown colored resin which had a Barcol hardness of 40.

The homopolymers of the foregoing examples were tested and found suitable for the purposes set forth herein.

The monomeric diepoxide compounds can be polymerized and copolymerized with other functional and polyfunctional materials such as polycarboxylic acids, polyols, amines and polyamines, polycarboxylic acid anhydrides, epoxides and polyepoxides and the like.

What is claimed is:

1. A polymerized composition obtained by heating in the presence of an acid catalyst a compound corresponding to the general formula:

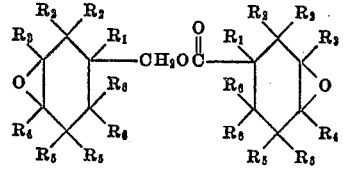

where $R_1$, $R_2$, $R_3$, $R_4$, $R_5$ and $R_6$ represent members selected from the group consisting of hydrogen and alkyl groups.

2. The polymerized composition of claim 1, wherein the diepoxide is 3,4-epoxycyclohexylmethyl 3,4-epoxycyclohexanecarboxylate.

3. The polymerized composition of claim 1, wherein the diepoxide is 3,4-epoxy-6-mthylcyclohexylmethyl 3,4-epoxy-6-methylcyclohexanecarboxylate.

4. The polymerized composition of claim 1, wherein the diepoxide is 3,4-epoxy-1-methylcyclohexylmethyl 3,4-epoxy-1-methylcyclohexanecarboxylate.

5. The polymerized composition of claim 1, wherein the diepoxide is 3,4-epoxy-2-methylcyclohexylmethyl 3,4-epoxy-2-methylcyclohexanecarboxylate.

6. The polymerized composition of claim 1, wherein the diepoxide is 3,4-epoxy-3-methylcyclohexylmethyl 3,4-epoxy-3-methylcyclohexanecarboxylate.

7. The polymerized composition of claim 1, wherein the diepoxide is 3,4-epoxy-4-methylcyclohexylmethyl 3,4-epoxy-4-methylcyclohexanecarboxylate.

8. The polymerized composition of claim 1, wherein the diepoxide is 3,4-epoxy-5-methylcyclohexylmethyl 3,4-epoxy-5-methylcyclohexanecarboxylate.

References Cited in the file of this patent

UNITED STATES PATENTS

| 2,706,181 | Pruitt et al. | Apr. 12, 1955 |
| 2,706,182 | Pruitt et al. | Apr. 12, 1955 |
| 2,706,189 | Pruitt et al. | Apr. 12, 1955 |
| 2,716,123 | Frostick et al. | Aug. 23, 1955 |